United States Patent [19]

Knorr et al.

[11] 4,433,122

[45] Feb. 21, 1984

[54] STOPPING/RESTARTING FREE RADICAL POLYMERIZATIONS

[75] Inventors: Raymond S. Knorr, Pensacola, Fla.; Joe D. Chandler, Decatur, Ala.; Loi N. Tran, Harvey, La.

[73] Assignee: Monsanto Company, St. Louis, Mo.

[21] Appl. No.: 373,822

[22] Filed: May 3, 1982

[51] Int. Cl.$^3$ .......................... C08F 6/02; C08F 20/44
[52] U.S. Cl. ...................................... 526/83; 526/296; 526/329.3; 526/330; 526/341; 526/342
[58] Field of Search .......................................... 526/83

[56] References Cited

U.S. PATENT DOCUMENTS 3,681,311  8/1972  Patron et al. .......................... 526/83

Primary Examiner—Harry Wong, Jr.
Attorney, Agent, or Firm—John W. Whisler

[57] ABSTRACT

A method for stopping and restarting the free-radical polymerization of vinyl monomers (e.g. acrylic monomers) without forming low molecular weight polymer is provided. These polymerizations utilize a Redox catalyst system comprising multivalent metal ions (e.g. iron ions) as promoter. The polymerizations are stopped by chelation of the iron present. Additional monomer is added to the polymerization to avoid formation of low molecular weight polymer. Upon restart metal ions are added to the polymerization mixture.

14 Claims, No Drawings

STOPPING/RESTARTING FREE RADICAL POLYMERIZATIONS

BACKGROUND OF THE INVENTION

A. Field of the Invention

This invention relates to processes for preparing polymers by the free-radical polymerization of vinyl monomer(s) using a Redox catalyst system comprising oxidizing agent, reducing agent and metal ions (e.g. iron ions) as promoter. More particularly, the invention relates to stopping and restarting such processes without forming off-specification polymer. By "off-specification" polymer is meant polymer having properties, such as specific viscosity, significantly different from the polymer desired. By "significantly different" is meant a difference which adversely affects the utility of the polymer, for example, its dyeability or strength in fiber form.

B. Description of the Prior Art

Processes for the free-radical polymerization of vinyl monomer(s) using the above-mentioned Redox catalyst system are well-known in the art, for example, the aqueous dispersion polymerization of acrylonitrile with one or more vinyl monomers to form acrylic polymer. Commercially, this process is carried out by continuously introducing feed materials (monomers, Redox catalyst components, water, etc.) to a stirred reactor and continuously withdrawing an aqueous stream comprising dispersed acrylic polymer, unreacted monomer and catalyst components from the reactor, usually, by permitting the contents of the reactor to flow into a conduit located near the top of the reactor. An agent is added to the withdrawn stream to shortstop the polymerization reaction and permit recovery of the unreacted monomer. A Redox catalyst system which may be used with this process comprises persulfate ions ($=S_2O_8$) as oxidizing agent, bisulfite ions ($^-HSO_3$) as reducing agent and iron ions ($Fe^{++}$ and $Fe^{+++}$) as promoter. Reactions involved with use of such a system include:

 (1)

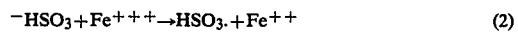 (2)

 (3)

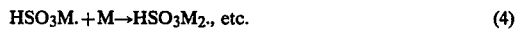 (4)

 (5)

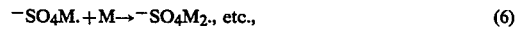 (6)

where M represents vinyl monomer and M. represents vinyl monomer radical. The iron ions simultaneously react with oxidizing agent (1) and reducing agent (2) to form radicals that initiate polymerization of the vinyl monomer (3) and (4) and also (5) and (6). The normal commercial practice for halting or stopping this process is simply to stop all feed material to the reactor when required, for example, when a mechanical failure occurs or when preventive maintenance is needed. The process is normally restarted by simply once again introducing the feed materials to the reactor. This method of stopping and restarting the process causes large amount of off-specification polymer to be formed when the polymerization is stopped and again when it is restarted. The off-specification polymer has unacceptable dyeing characteristics for fiber applications. Segregation of off-specification polymer from polymer within specifications is a costly and time consuming operation. Typically, upon restarting the process, the aqueous stream withdrawn from the reactor is discarded until all the polymer is once again within specifications.

SUMMARY OF THE INVENTION

In accordance with the present invention a method is provided for stopping and restarting free-radical polymerization of vinyl monomer(s) without producing off-specification polymer wherein a Redox catalyst system is used comprising a promoter consisting of multivalent metal ions, reducing agent and oxidizing agent. The method comprises the steps of:

(a) adding sufficient chelating agent to chelate metal ions present as promoter (b) adding monomer(s) in an amount to ensure that monomer radicals already present when the chelating agent is added are polymerized to form polymer within specifications and (c) restarting the polymerization by adding a sufficient amount of a multivalent metal compound or multivalent metal to provide a concentration of promoter corresponding to that present before the chelating agent was added.

The chelating agent added in step (a) reacts with the metal ions present as promoter to form ring-type structures incorporating the metal ions. In the chelated form, the metal ions can no longer function as promoter for the catalyst and the polymerization stops. Monomer added in step (b) ensures that monomer radicals already present when the chelating agent is added polymerize to form polymer within specifications. The molecular weight (MW) of the polymer is proportional to the concentration of monomer [M] present and inversely proportional to the concentration of monomer radical [M.] present, i.e.: $Mw \propto [M]/[M.]$.

When the polymerization is restarted a metal compound or metal is added in an amount sufficient to provide a concentration of metal ions corresponding substantially to that present before the chelating agent was added.

PREFERRED EMBODIMENTS OF THE INVENTION

The stop/restart method of the invention may be used with any batch or continuous free-radical polymerization process of the type wherein vinyl monomer(s) are polymerized using a Redox catalyst system comprising a reducing agent, an oxidizing agent and a multivalent metal ion as promoter.

Representative oxidizing agents include peroxides, percarbonates, perborates, chlorates, perdisulfates and persulfates, for example, hydrogen peroxide or sodium or ammonium persulfate. Representative reducing agents include oxidizable sulfoxy compounds, such as, bisulfites, sulfates and sulfinic acids, for example, sodium bisulfite, metabisulfite, sodium hydrosulfite, sodium thiosulfate, dialkyl sulfites and sulfinic acids. Representative multivalent metal ions include ions of iron, vanadium, indium, thorium, scandium, gallium, titanium, nickel, copper, cobalt, chromium, etc. The metal is conveniently added to an aqueous medium in the form of one of its water soluble salts, for example, $FeSO_4$.

In carrying out step (a) of the method of the present invention, any suitable chelating agent may be added to the polymerization mixture to chelate the metal ions.

Representative chelating agents include ethylenediaminetetraacetic acid (EDTA), diethylenetriaminepentaacetic acid (DTPA), nitrilotriacetic acid (NTA) and N-hydroxyethylethylenediaminetriacetic acid (HEDTA). Sufficient chelating agent is added to chelate the multivalent metal ions present. Normally, a slight excess is added to assure that all of the metal ions present are chelated. At the time the chelating agent is added and the metal ions chelated, monomer radicals already present will continue to polymerize even though further monomer radicals will not be formed. It has been discovered that unless additional monomer is added to the polymerization mixture along with the chelating agent, these monomer radicals already present will polymerize to form low molecular weight, off-specification polymer. Reducing the molecular weight of the polymer, increases the concentration of terminal $SO_3$ and $SO_4$ groups in terms of $SO_3$ and $SO_4$ groups per gram of polymer, which in turn alters the dyeing characteristics of the polymer.

In carrying out step (b) of the method of this invention, sufficient monomer is added to the polymerization mixture to ensure that the monomer radicals present at the time of chelation polymerize to form polymer within specifications. The amount of monomer that must be added to achieve this result can be easily determined experimentally.

In carrying out step (c) of the method of this invention, polymerization of monomer is restarted by adding multivalent metal ions in an amount sufficient to provide substantially the same concentration of metal ions that existed before the chelating agent was added. In this way, the process returns immediately to forming polymer within specifications. If excess chelating agent was added to stop the polymerization, then the metal ions must be added in amount in excess of the original ion concentration corresponding to the amount needed to react with the excess chelating agent present.

The method of this invention is particularly useful for stopping and restarting free-radical polymerization of one or more vinyl monomers to form acrylic polymers. The term acrylic as used herein means any long chain synthetic polymer composed of at least 35% by weight and, preferably, at least 85% by weight of acrylonitrile units

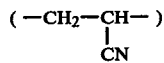

in the polymer chain and includes copolymers of acrylonitrile. Acrylic polymers are prepared by reacting vinyl monomers comprising from 35% to 100% by weight of acrylonitrile and from 65% to 0% by weight, respectively, of one or more suitable vinyl monomers copolymerizable with acrylonitrile such as vinyl acetate, methyl acrylate, methyl methacrylate, styrene, vinyl chloride, vinylidene chloride, vinyl bromide and the like.

The method of this invention may be used in conjunction with free-radical polymerization processes carried out with or without a diluent. Conventionally, a diluent such as water or dimethylsulfoxide is used.

The following example is given to further illustrate the invention. In the example specific viscosities (Nsp) are measured at 25° C. in dimethylformamide as solvent at a polymer concentration of 0.1 g per 1.0 deciliter of solvent.

EXAMPLE

This example is given to further illustrate the invention. In the example the method of this invention is used to stop and restart a free-radical polymerization reaction wherein at steady state conditions water, Redox catalyst components, monomers, pH regulator and promoter are continuously introduced into a stirred reactor maintained at 50° C. and a pH of about 3, and an aqueous stream comprising dispersed acrylic polymer, unreacted monomer, and catalyst components is continuously withdrawn from the reactor through an outlet pipe located in the side and near the top of the reactor. The following feed streams are introduced into the reactor:

1. acrylonitrile (AN) and vinyl acetate (VA) in a weight ratio of about 9.2 parts (VA) to 90.8 parts (AN) at the rate of 1860 Kg per hour
2. aqueous solution of $FeSO_4$ (source of metal ions)
3. water
4. aqueous solution of $SO_2$
5. aqueous solution of $NaHCO_3$ (pH regulator) and $(NH_4)_2S_2O_8$ Sufficient amounts of materials are introduced into the reactor to provide an iron level of 0.4 ppm per unit weight of monomer; and $SO_2$ to $(NH_4)_2S_2O_8$ ratio of about 2.5 to 1 and; a water to monomer weight ratio of about 3.5 to 1. Under these conditions about 1250 Kg of copolymer of acrylonitrile and vinyl acetate having an specific viscosity of $0.155 \pm 0.005$ were prepared per hour.

The polymerization is stopped (i.e. shut-down) by turning off feed streams Nos. 2,3,4 and 5 and adding to the reactor 350 grams of a 34% aqueous solution of sodium EDTA diluted with water to one gallon. This amount of EDTA was sufficient to chelate the iron ions present.

Monomer feed stream No. 1 is continued for an additional six minutes and then it is turned off. The addition of this amount of monomer was previously determined by experimentation to be required to enable the monomer radicals present when the EDTA is added to polymerize to an specific viscosity of $0.155 \pm 0.005$.

After a period of 150 minutes the polymerization is restarted by adding to the reactor 15 grams of $FeSO_4 \cdot 7H_2O$ dissolved in 3.785 liters of water followed immediately by turning back on the feed streams.

A plot of the specific viscosity (Nsp) against time shows that 90 minutes after the chelating agent is added the Nsp is still 0.155 and after 150 minutes when the polymerization is restarted the Nsp is still to 0.151.

For purpose of comparison, the stopping and restarting of the above polymerization run (Run A) is carried out under identical conditions except: in one instance (Run C) additional monomer is not added (all feed streams are turned off at shut-down); in another instance (Run D) monomer is added but no EDTA is added at shut-down and no $FeSO_4 \cdot 7H_2O$ is added at restart; in yet another instance (Run B) neither monomer nor EDTA are added at or after shut-down and $FeSO_4 \cdot 7H_2O$ is not added at restart. Table I summarizes the runs made:

TABLE I

| | At Shut-down | | At Restart |
|---|---|---|---|
| | Materials Added | | |
| RUN | EDTA | MONOMER | FeSO$_4$.7H$_2$O |
| A | Yes | Yes | Yes |
| B | No | No | No |
| C | Yes | No | Yes |
| D | No | Yes | No |

The effect of the shut-down/restart procedure of each Run on polymer specific viscosity Nsp is given in Table II.

TABLE II

| | Minutes after Shut-down | | | |
|---|---|---|---|---|
| RUN | SHUT-DOWN | 10 | 30 | 60 | Restart/min. |
| A | 0.155 | 0.155 | 0.155 | 0.155 | 0.151/150 |
| B | 0.154 | 0.150 | 0.147 | 0.145 | 0.145/150 |
| C | 0.156 | 0.154 | 0.151 | 0.146 | 0.145/145 |
| D | 0.155 | 0.152 | 0.149 | 0.146 | 0.144/150 |

The results in Table II show that the three-step, stop/restart method of the present invention (Run A) prevents the formation of off-specification polymer. The results show the importance of adding monomer at shut-down (compare RUN A with RUN C).

The results of Run D show that adding monomer at shut-down without also adding a chelating agent did not prevent formation of off-specification polymer.

What is claimed is:

1. A method of stopping and restarting the free radical polymerization of vinyl monomer(s) comprising from 35% to 100% by weight of acrylonitrile and from 65% to 0% by weight, respectively, of at least one vinyl monomer copolymerizable therewith, wherein the polymerization utilizes a redox catalyst system comprising a promoter consisting of multivalent metal ions, a reducing agent and an oxidizing agent, said method comprising the steps of:
   (a) stopping the polymerization by adding thereto sufficient chelating agent to chelate said multivalent metal ions,
   (b) adding said monomer(s) to the polymerization in an amount sufficient to ensure that monomer radicals present at the time metal ions are chelated polymerize to form polymer having a specific viscosity corresponding substantially to that of polymer formed before the chelating agent was added and
   (c) subsequently restarting the polymerization by adding thereto a multivalent metal compound or multivalent metal in an amount sufficient to provide a concentration of promoter corresponding substantially to the concentration of promoter present before the chelating agent was added.

2. The method of claim 1 wherein the polymerization is carried out in the presence of a diluent.

3. The method of claim 2 wherein the diluent is water.

4. The method of claim 3 wherein the polymerization is carried out by continuously introducing feed materials comprising monomer(s), redox catalyst components, and water to a stirred reactor and continuously withdrawing an aqueous stream comprising dispersed polymer, unreacted monomer(s) and catalyst components from the reactor and wherein the introduction of said feed materials to the reactor and withdrawal of said aqueous stream from the reactor are discontinued when the chelating agent is added in step (a) and are resumed when the metal compound or metal is added in step (c).

5. The method of claim 4 wherein the vinyl monomers comprise acrylonitrile and one or more vinyl monomers copolymerizable therewith.

6. The method of claim 5 wherein the vinyl monomers copolymerizable with said acrylonitrile are selected from the group consisting of vinyl acetate, methyl acrylate, methyl methacrylate, styrene, vinyl chloride, vinylidene chloride and vinyl bromide.

7. The method of claim 6 wherein the oxidizing agent is a peroxide, percarbonate, perborate, chlorate, perdisulfate or persulfate.

8. The method of claim 7 wherein the reducing agent is an oxidizable sulfoxy compound.

9. The method of claim 8 wherein the sulfoxy compound is sulfur dioxide, a bisulfite, sulfite or sulfinic acid.

10. The method of claim 9 wherein the sulfoxy compound is sodium bisulfite.

11. The method of claim 9 wherein the oxidizing agent is a persulfate.

12. The method of claim 11 wherein the oxidizing agent is ammonium persulfate.

13. The method of claim 9 wherein the multivalent ions comprise iron ions.

14. The method of claim 13 wherein the vinyl monomers are acrylonitrile and vinyl acetate.

* * * * *